United States Patent
Itakura (10) Patent No.: US 11,740,062 B2
(45) Date of Patent: Aug. 29, 2023

(54) CONTROL DEVICE, MEASUREMENT SYSTEM, AND MEASUREMENT METHOD

(71) Applicant: FANUC CORPORATION, Yamanashi (JP)

(72) Inventor: Shinichirou Itakura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 428 days.

(21) Appl. No.: 17/121,782

(22) Filed: Dec. 15, 2020

(65) Prior Publication Data

US 2021/0180932 A1 Jun. 17, 2021

(30) Foreign Application Priority Data

Dec. 16, 2019 (JP) .................. 2019-226291

(51) Int. Cl.
*G01B 5/008* (2006.01)

(52) U.S. Cl.
CPC .......... *G01B 5/008* (2013.01); *G01B 2210/58* (2013.01)

(58) Field of Classification Search
CPC .... G01B 5/004; G01B 5/008; G01B 2210/58; G01B 21/04; G05B 2219/37207; G05B 2219/37222; G05B 2219/50047; G05B 2219/50063; G05B 2219/50065; G05B 19/401; G05B 19/409; G05B 19/4093; G05B 2219/34242

See application file for complete search history.

(56) References Cited

U.S. PATENT DOCUMENTS

| | | | |
|---|---|---|---|
| 7,231,326 B1 * | 6/2007 | Chang .................... | G01B 21/04 702/196 |
| 2018/0024525 A1 * | 1/2018 | Inoue .................... | G05B 19/402 700/193 |
| 2019/0111534 A1 * | 4/2019 | Ishii .................... | G01B 21/047 |

FOREIGN PATENT DOCUMENTS

JP 2008111770 A 5/2008

* cited by examiner

*Primary Examiner* — Benjamin R Schmitt
(74) *Attorney, Agent, or Firm* — HAUPTMAN HAM, LLP

(57) ABSTRACT

A user manually operates the probe of a machine tool to move toward a workpiece. A movement history of the user's manual operation is recorded. The positional relationship between a workpiece and the probe is estimated based on the history of movement of the probe by the manual operation. The controller presents a candidate for the direction of the probe to be moved in the automatic measurement of the workpiece. The user inputs the movement direction of the probe with reference to content of the presentation.

8 Claims, 6 Drawing Sheets

| AXIS | LAST MOVEMENT DIRECTION | LAST AMOUNT OF MOVEMENT |
|---|---|---|
| X | − | 100 |
| Y | + | 500 |
| Z | NOT MOVED | NOT MOVED |

FIG.3B

| MOVEMENT NUMBER | AXIS | MOVEMENT DIRECTION | AMOUNT OF MOVEMENT |
|---|---|---|---|
| 1 | X | + | 100 |
| 2 | Y | − | 90 |
| 3 | X | + | 150 |
| 4 | Y | − | 90 |
| 5 | X | + | 200 |
| ... | ... | ... | ... |

FIG.3C

| MOVEMENT NUMBER | AXIS | MOVEMENT DIRECTION |
|---|---|---|
| 1 | X | + |
| 2 | Y | − |
| 3 | X | + |
| 4 | Y | − |
| 5 | X | + |
| ... | ... | ... |

MOVEMENT HISTORY

| NUMBER | AXIS | DIRECTION |
|---|---|---|
| 1 | X | + |
| 2 | Y | − |
| 3 | X | + |
| 4 | Y | − |
| 5 | X | + |
| 6 | Y | − |
| 7 | X | − |
| 8 | Y | − |

FIG.5B

MOVEMENT HISTORY

| NUMBER | AXIS | DIRECTION | AMOUNT |
|---|---|---|---|
| 1 | Y | + | 1000 |
| 2 | X | + | 1100 |
| 3 | Y | − | 300 |
| 4 | X | − | 250 |
| 5 | Y | − | 50 |

FIG.5C

MOVEMENT HISTORY

| NUMBER | AXIS | DIRECTION | AMOUNT |
|---|---|---|---|
| 1 | X | + | 1000 |
| 2 | Y | − | 500 |
| 3 | X | − | 400 |
| 4 | Y | + | 70 |

CONTROL DEVICE, MEASUREMENT SYSTEM, AND MEASUREMENT METHOD

RELATED APPLICATIONS

The present application claims priority to Japanese Patent Application Number 2019-226291 filed Dec. 16, 2019, the disclosure of which is hereby incorporated by reference herein in its entirety.

BACKGROUND OF THE INVENTION

Field of the Invention

The present invention relates to a control device, measurement system, and measurement method for an industrial machine.

Description of the Related Art

Various industrial machines, such as machine tools and industrial robots, are used on a manufacturing floor. The machine tool is one of the industrial machines which machines a workpiece according to a program. To execute a program, a reference position of the workpiece needs to be set in the controller of the machine tool. To detect the reference position of the workpiece, a probe can be mounted on a spindle in the machine tool. The probe detects contact between the probe itself and the workpiece. The controller calculates position and dimensions of the workpiece based on the position where the probe detects contacts.

Conventionally, there has been several measurement types, such as "hole measurement", "point measurement", "corner measurement", "tool length measurement", and "tool diameter measurement". When one of the measurement types is selected, a measurement program and a measurement operation process corresponding to the selected measurement type are invoked. Necessary operation buttons for the measurements and measurement results are displayed on a display unit, and an operator can set a workpiece coordinate system by operating the probe according to a display screen (see Japanese Patent Application Laid-Open No. 2008-111770, for example).

In operating the probe, as described above, the movement direction of the probe is represented by a positive or negative sign and an axis name, such as "+X" or "−Y". The coordinate system set in the machine tool is invisible so that a user needs to imagine the coordinate system and axis and direction in order to operate the probe.

There is another method to set a workpiece coordinate system. In this method, a numerical controller stores templates for measuring a workpiece. An estimated size of the workpiece and the movement direction of the probe are input to the template. The operator moves the probe to a position prescribed by the template and executes the program to automatically measure a reference point of the workpiece. The reference point is used to constitute a workpiece coordinate system.

In the automatic measurement of reference points of workpiece coordinate system, the first movement direction of the probe (the movement direction of the probe from the prescribed measurement start position) need to be input to numerical controller. When this is done, the probe may move in an unexpected direction unless the movement direction of the probe is input correctly.

SUMMARY OF THE INVENTION

In order to overcome these problems, a mechanism is required to facilitate recognition of the movement direction of a probe in an industrial machine.

A control device according to one aspect of the present disclosure is a control device for an industrial machine configured to control a probe to measure the position of a workpiece, the control device comprising: a manual operation unit configured to accept a manual operation of the probe from a user; a movement history recording unit configured to record the history of movement of the probe by the manual operation; a measurement program creation unit configured to create a measurement program for the workpiece; a movement direction presentation unit configured to estimate a candidate for the movement direction of the probe based on the history of movement of the probe by the manual operation and present the user with the candidate of the movement direction of the probe to be used in the creation of the measurement program for the workpiece; and an input unit configured to accept the user's input including the movement direction, the measurement program creation unit being configured to create the measurement program for the workpiece using the user's input including the moving direction.

A measurement system according to one aspect of the present disclosure is a measurement system configured to control a probe to measure a workpiece, the measurement system comprising: a manual operation unit configured to accept a manual operation of the probe from a user; a movement history recording unit configured to record the history of movement of the probe by the manual operation; a measurement program creation unit configured to create a measurement program for the workpiece; a movement direction presentation unit configured to a candidate for the movement direction of the probe based on the history of movement of the probe by the manual operation and present the user with the candidate of the movement direction of the probe to be used in the creation of the measurement program for the workpiece; and an input unit configured to accept the user's input including the movement direction, the measurement program creation unit being configured to create the measurement program for the workpiece using the user's input including the movement direction.

A measurement method according to one aspect of the present disclosure is a measurement method for controlling a probe to measure a workpiece, the measurement method comprising: accepting a manual operation of the probe from a user; recording the history of movement of the probe by the manual operation; estimating a candidate for the movement direction of the probe based on the movement history of the probe; presenting the user with the candidate of the movement direction of the probe to be used in the creation of the measurement program for the workpiece; accepting the user's input including the movement direction; and creating the measurement program for the workpiece using the user's input including the movement direction.

According to one aspect of the present invention, the movement direction of a probe in an industrial machine is rendered easily recognizable.

DETAILED DESCRIPTION OF THE PREFERRED EMBODIMENTS

Figure 1:
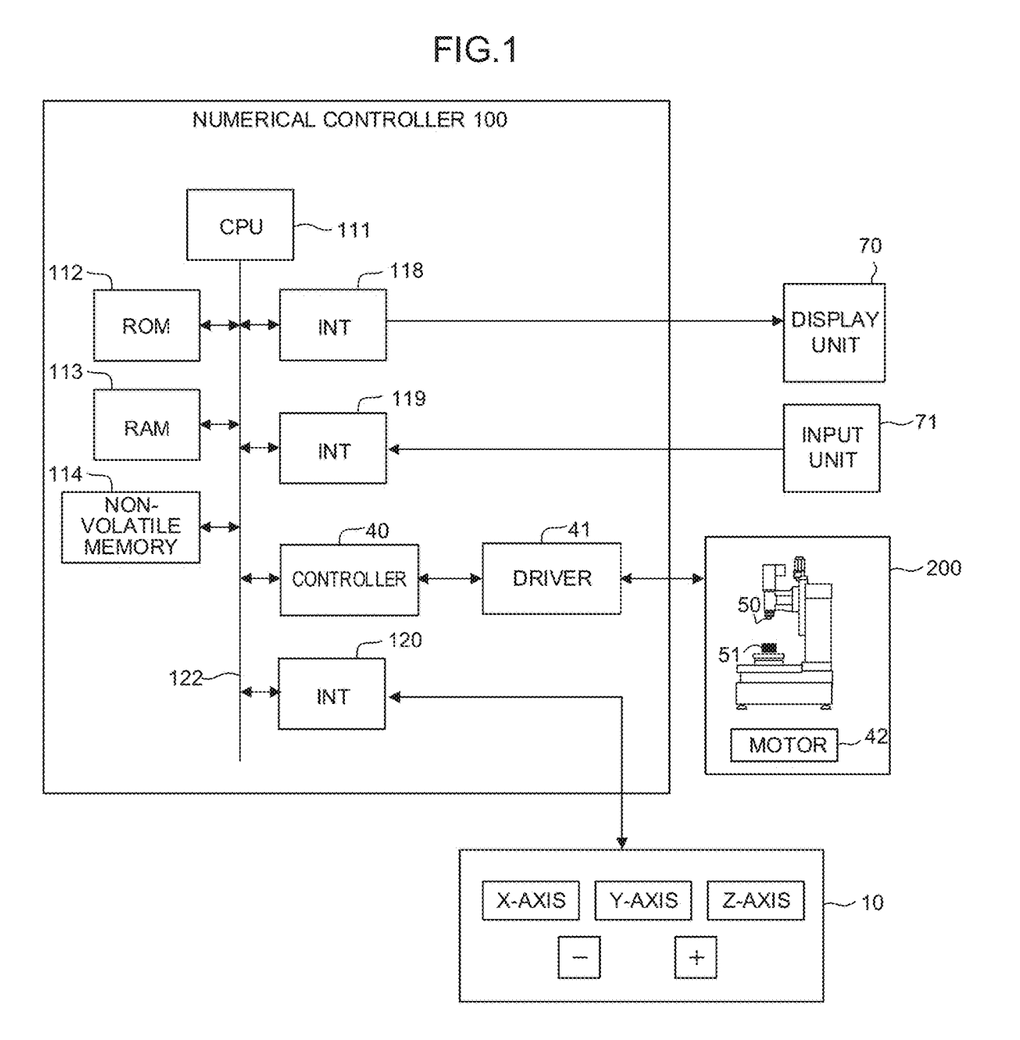
FIG. 1 is a hardware configuration diagram of a numerical controller according to the present disclosure.

The following is a description of a numerical controller 100 as a control device of the present disclosure. A CPU 111 of the numerical controller 100 shown in FIG. 1 is a processor for generally controlling the numerical controller 100. The CPU 111 reads out a system program stored in a ROM 112 via a bus 122 and controls the entire numerical controller 100 according to this system program. A RAM 113 is temporarily loaded with temporary calculation data and display data, various data input by a user through an input unit 71, and the like.

A display unit 70 is a monitor or the like attached to the numerical controller 100. The display unit 70 displays a selection screen for templates 17 (described later), a workpiece data input screen, and the like.

The input unit 71 is a keyboard, touch panel, or the like. The touch panel is integral with the display unit 70. The user operates the input unit 71 to perform input to the screens displayed on the display unit 70, for example.

A non-volatile memory 114 is a memory that is, for example, backed up by a battery (not shown) so that its storage state can be maintained even when the numerical controller 100 is switched off. The non-volatile memory 114 is stored with programs read from external equipment through an interface (not shown), programs input through the display unit 70, various data (e.g., set parameters acquired from a machine tool 200) acquired from various parts of the numerical controller 100, the machine tool 200, and the like. The programs and the various data stored in the non-volatile memory 114 may be developed in the RAM 113 during execution and use. Moreover, various system programs are previously written in the ROM 112.

A controller 40 for controlling axes of the machine tool 200 converts an axis movement command from the CPU 111 into a pulse signal and outputs it to a driver 41. The driver 41 converts the pulse signal into a current, thereby driving a motor 42.

A probe 50 is mounted on a drive unit (spindle, etc.). The motor 42 relatively moves the probe 50 to a workpiece 51. In the present disclosure, the probe 50 and the workpiece 51 relatively move in the directions of three axes; X-, Y- and Z-axes, however, they may be designed to move in the directions of four or five axes.

The probe 50 is a device for detecting the position of an object to be measured. The probe 50 of the present disclosure detects contact with the workpiece 51. The probe 50 may be designed to detect the position in a noncontact manner using infrared rays or the like.

A manual operation unit 10 accepts a manual operation of the motor 42. In manual operation, the probe 50 moves along the axes of the machine tool 200. The user operates the probe 50 to locate it in a measurement start position $M_{STR}$.

Figure 2:
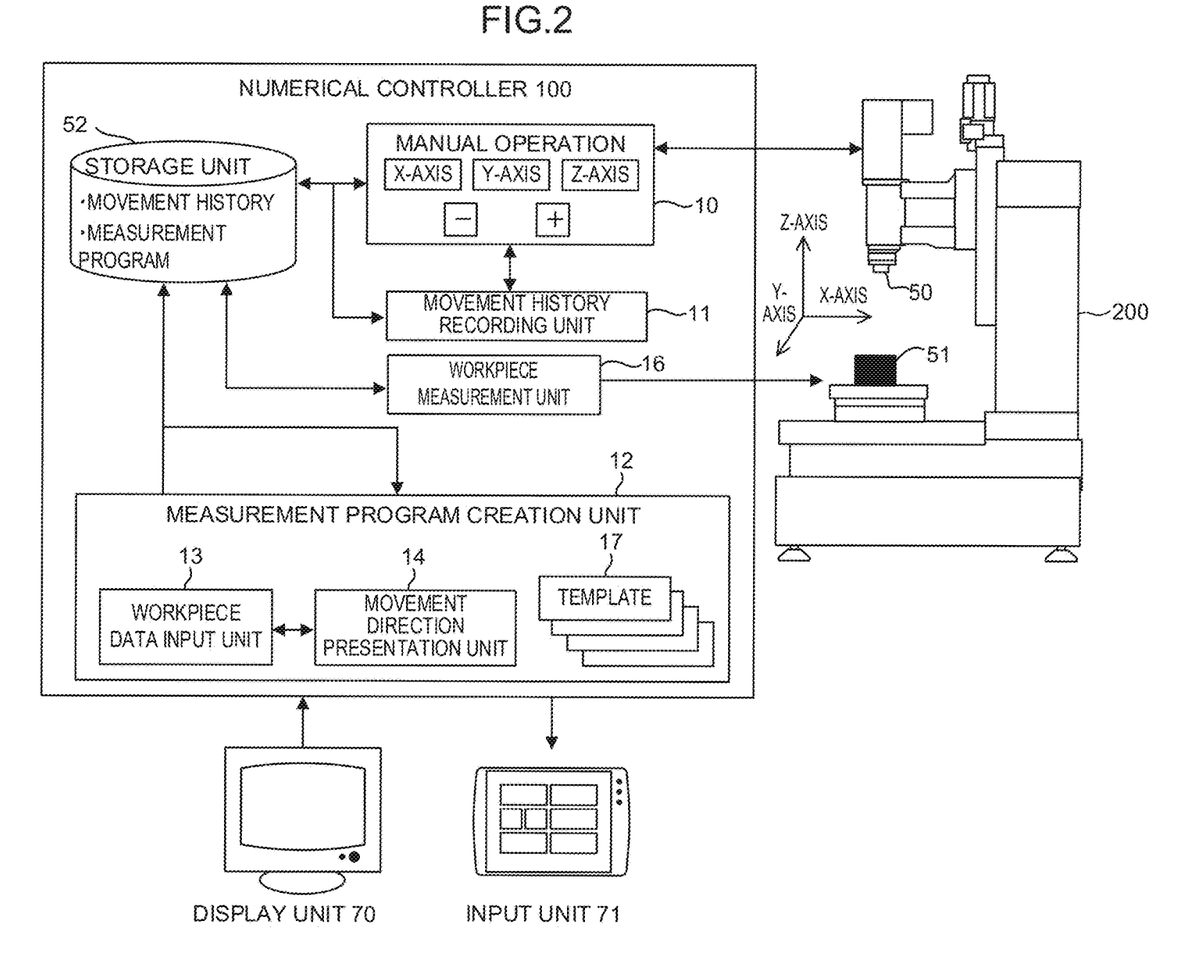
FIG. 2 is a block diagram of the numerical controller according to the present disclosure.

The numerical controller 100 will be described with reference to FIG. 2. FIG. 2 is a block diagram of the numerical controller 100. The numerical controller 100 comprises the manual operation unit 10 configured to accept the user's manual operation, a movement history recording unit 11 configured to record the history of the movement of the probe by the manual operation, a measurement program creation unit 12 configured to create a measurement program for the workpiece 51, a workpiece data input unit 13 configured to accept input of workpiece data, a movement direction presentation unit 14 configured to present a candidate for the movement direction of the probe 50 to the user, and a workpiece measurement unit 16 configured to measure the workpiece 51 according to the measurement program.

The manual operation unit 10 accepts the manual operation of the probe 50. The operation unit 10 may be a button, handle, touch panel, keyboard, lever, dial, or the like. Types of operation unit 10 are not limited. The probe 50 is mounted on the drive unit of the machine tool 200. In the manual operation, the probe 50 moves along the axes of the machine tool 200. In the machine tool 200 of FIG. 2, the probe 50 moves in the directions of the three axes; the X-, Y- and Z-axes. The amount of movement of the probe 50 can be calculated based on a command amount output to the controller 40. The manual operation unit 10 may alternatively be provided on the machine tool 200.

Figure 3A:
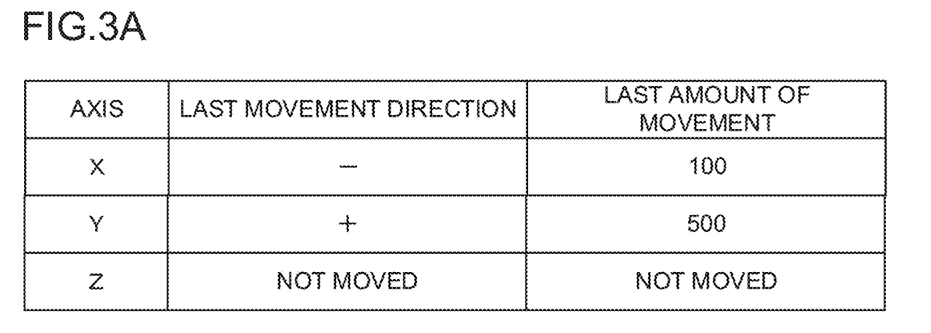
FIGS. 3A to 3C are diagrams showing a configuration example of a movement history.
Figure 3B:
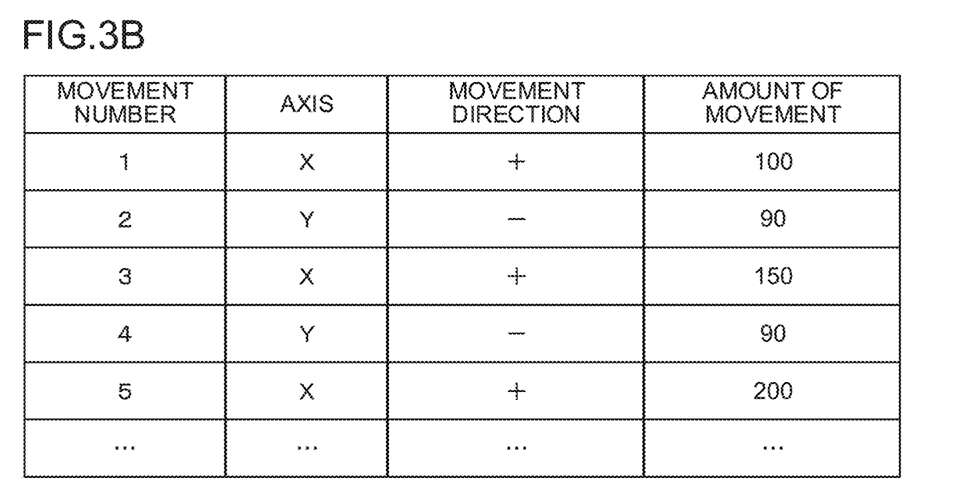
Figure 3C:
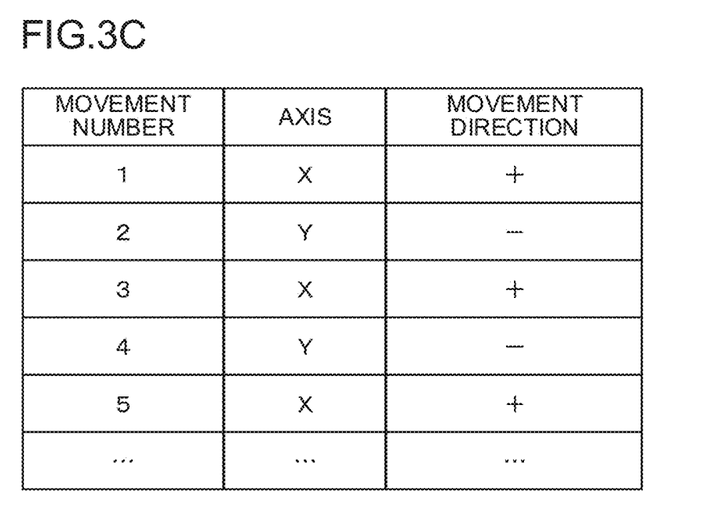

The movement history recording unit 11 records the movement history of the probe 50 in the manual operation into a storage unit 52. It is to be desired that the movement history of the probe 50 be recorded for each axis of the machine tool 200. As the movement history of the probe 50, only the last movement may be recorded, as shown in the table of FIG. 3A, or all movements of the probe 50 from the start of movement until the end may be recorded, as shown in the table of FIG. 3B. Only the movement direction may be recorded, as shown in the table of FIG. 3C. Unintended movements resulted from undesired hand motion or erroneous input may be excluded from the history data to be recorded. In the present disclosure, the movement direction presentation unit 14 sorts out data (described later).

The measurement program creation unit 12 comprises the templates 17, workpiece data input unit 13, and movement direction presentation unit 14. Each of the templates 17 is provided for the shape of each workpiece to be measured and each measurement method.

The workpiece data input unit 13 displays an input screen corresponding to a selected template 17 on the display unit 70. This input screen (hereinafter referred to as the workpiece data input screen) accepts input of the dimensions of the workpiece 51, the movement direction of the probe 50, the amount of movement of the probe 50, and the like.

In the present disclosure, a candidate for the movement direction of the probe 50 is presented on the workpiece data input screen. The user inputs the movement direction with reference to the presented candidate.

The movement direction presentation unit 14 estimates the next movement direction of the probe 50 based on the movement history of the probe 50 having so far been moved by the user and presents the estimated movement direction as a movement direction candidate to the user. The following is a description of an estimation method for the movement direction. In this example to be described, a workpiece 51 with a cuboid shape is measured and an end surface of the workpiece is used as a datum plane to set a workpiece coordinate system.

Firstly, a user selects a template. A template is determined on conditions such as the shape of the workpiece 51 is cuboid, the object of measurement is the Y-direction end surface, and the content of measurement is setting of the workpiece coordinate system. The workpiece data input unit 13 displays a workpiece data input screen corresponding to the template.

Figure 4:
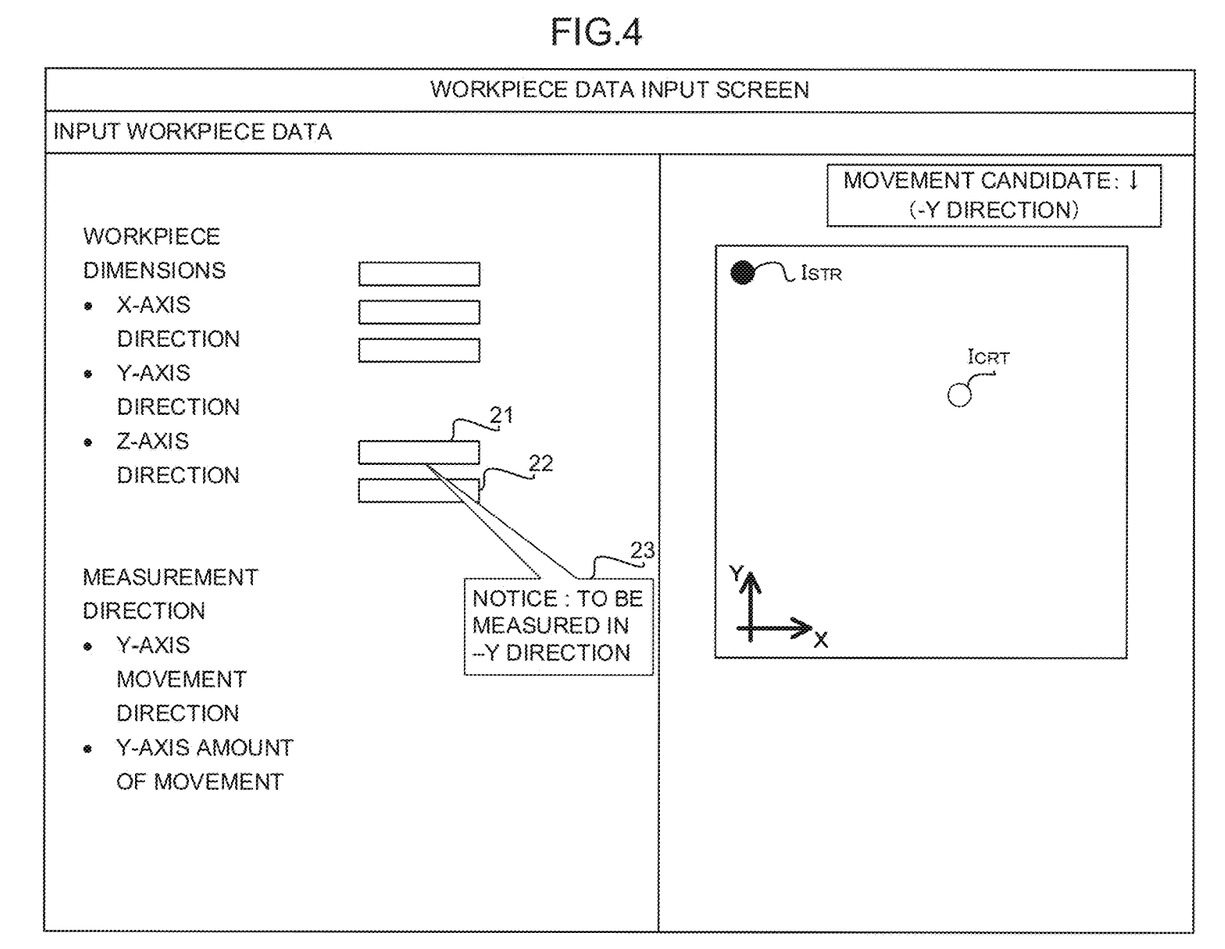
FIG. 4 is a diagram showing an example of a screen presenting a candidate for the movement direction of a probe.

FIG. 4 is an example of the workpiece data input screen. A start position $I_{STR}$ for manual movement of the probe 50 and a current position $I_{crt}$ of the probe 50 are displayed on the right-hand side of the workpiece data input screen. On this screen, a character string "movement candidate: ↓ (−Y direction)" is displayed at an upper right portion and a candidate for the movement direction of the probe 50 is presented.

An input area 21 for the movement direction of the probe 50 and an input area 22 for the moving distance of the probe 50 exist on the left-hand side of the measurement data input screen. A popup screen 23 is displayed in the movement-direction input area 21 in a superposed manner, and a candidate for the movement direction of the probe, "Notice: to be measured in −Y-axis direction?", is presented on the popup screen 23. The user can specify an actual movement direction of the probe 50 with reference to this display.

As described above, the numerical controller 100 of the present disclosure presents the candidate for the movement direction. Presenting the candidates helps user to image the coordinate system and prevents operation of the probe 50 in the wrong direction. When the workpiece 51 is set in the machine tool 200, the numerical controller has no information about the position of the workpiece 510. Therefore, the numerical controller 100 needs to be taught which direction and how far the probe 50 should be moved to measure the workpiece 51. The machine coordinate system is not visible for the user who inputs the positional relationship between the workpiece 51 and the probe 50. This may make it difficult for the user to image the machine coordinate system correctly and cause the user to select a wrong direction. The numerical controller 100 of the present disclosure records the history of the manual movement of the probe 50 and estimates the positional relationship between the probe 50 and the workpiece 51 and presents the result of the estimation to the user, thereby preventing erroneous input at the start of the automatic workpiece measurement.

Figure 5A:
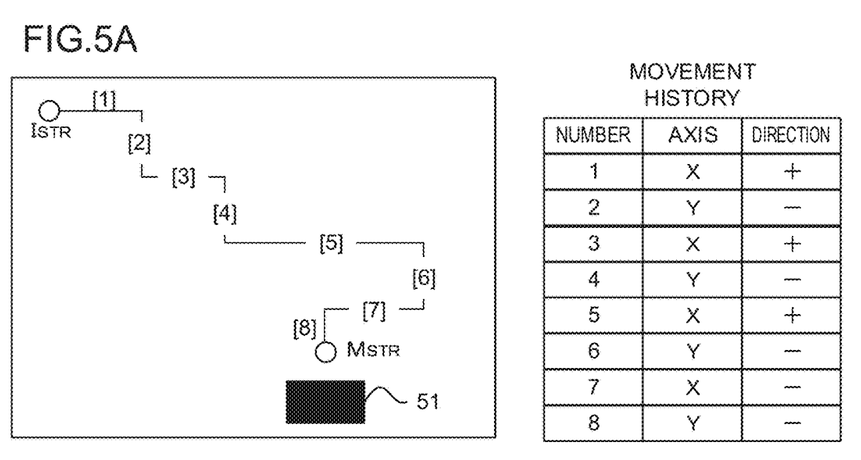
FIGS. 5A to 5C are diagrams illustrating an estimation method for the movement direction.
Figure 5B:
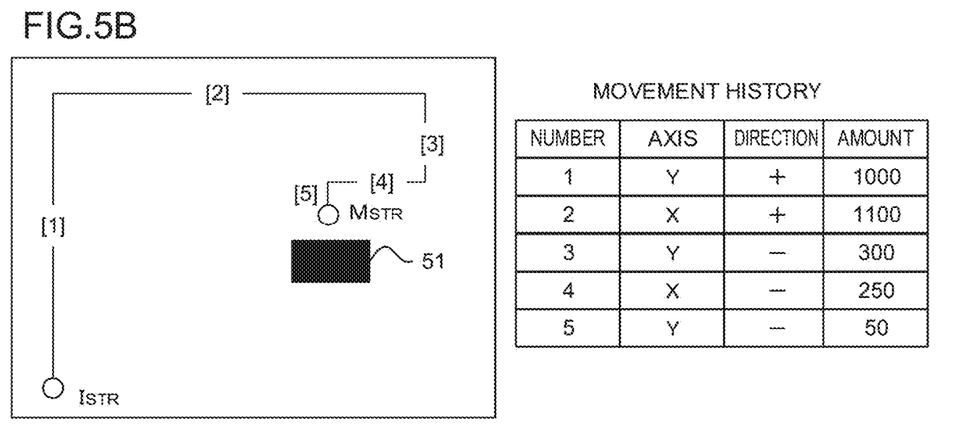
Figure 5C:
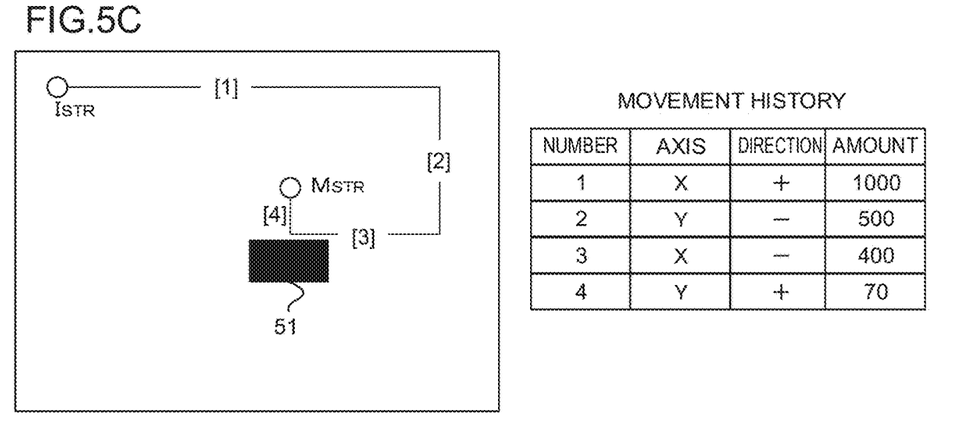

Then, the estimation method for the probe movement direction will be described. In this example, the probe measures the Y-axis end surface of the workpiece 51, so that only the movement in the Y-axis direction is presented to the user. $M_{STR}$ is the automatic measurement start position of the probe 50. To get to the position $M_{STR}$, user manually moves the probe 50. Some Paths are shown in FIGS. 5A to 5C. In the path of FIG. 5A, the probe 50 is moved in a [1] positive X-axis direction, [2] negative Y-axis direction, [3] positive X-axis direction, [4] negative Y-axis direction, [5] positive X-axis direction, [6] negative Y-axis direction, [7] negative X-axis direction, and [8] negative Y-axis direction to be located in the measurement start position $M_{STR}$. In the path of FIG. 5B, the probe 50 is moved in the [1] positive Y-axis direction, [2] positive X-axis direction, [3] negative Y-axis direction, [4] negative X-axis direction, and [5] negative Y-axis direction to be located in the measurement start position $M_{STR}$. In the path of FIG. 5C, the probe 50 is moved in the [1] positive X-axis direction, [2] negative Y-axis direction, [3] negative X-axis direction, and [4] positive Y-axis direction to be located in the measurement start position $M_{STR}$.

In the example of FIG. 5A, the probe 50 is manually moved in the negative direction in all the Y-axis-direction strokes [2], [4], [6] and [8], so that the position of the workpiece 51 can be estimated in the negative Y-axis direction relative to the probe 50. In the example of FIG. 5B, the probe 50 greatly moves in the positive Y-axis direction in the stroke [1], while it moves in the negative Y-axis direction in the strokes [3] and [5] thereafter. Since the probe 50 is moved in the negative Y-axis direction in the last movement stroke or final-stage movement strokes, the position of the workpiece 51 can be estimated in the negative Y-axis direction relative to the probe 50. In the example of FIG. 5C, the probe 50 is moved in the positive Y-axis direction in the stroke [4] after it is moved in the negative Y-axis direction in the stroke [2]. While the last movement stroke extends in the positive Y-axis direction, the amount of movement therein is small. If the sum of the amounts of movement in the strokes [2] and [4] is obtained, it indicates that the probe 50 is moved in the negative Y-axis direction and it can be considered that the amount of movement in the stroke [2] is compensated for.

In this way, it is estimated whether the workpiece 51 is located positive or negative direction in the Y-axis relative to the probe 50. In the case of FIG. 5A, the entire direction of manual operation can be a basis of estimation. In the case of FIG. 5B, the last or final-stage direction of manual operation can be a basis of estimation. In the case of FIG. 5C, the final-stage direction and amount of manual operation can be a basis of estimation.

The movement direction presentation unit 14 estimates the movement direction of the probe 50, that is, the direction of the workpiece 51 relative to the probe 50, from the aforementioned entire movement direction, the last or final-stage movement direction, the sum of the movement directions and the amounts of movement, and the like. Candidates for the estimated movement direction are displayed on the workpiece data input screen and the popup screen 23, as mentioned before.

In estimating the movement direction, the movement direction presentation unit 14 excludes data with small amounts of movement from data to be estimated. When the probe 50 is manually moved, the operation of the probe 50 may sometimes fluctuate due to undesired hand motion, delay in reaction, or the like. The movement direction presentation unit 14 may compare the amount of movement with a specified threshold or the like and adopt only operations with large enough to be considered as intentional operations of the user.

The measurement program creation unit 12 creates the measurement program for the workpiece 51 based on the template 17 selected by the user and information input to the workpiece data input screen. The workpiece measurement unit 16 measures the workpiece 51 according to the workpiece measurement program. In the aforementioned example of setting of the workpiece coordinate system, the end surface is measured as the datum plane, the datum line of the workpiece 51 is measured, the deviation of the workpiece 51 from the machine coordinate system is compensated for, and the origin of the workpiece coordinate system is set.

Figure 6:
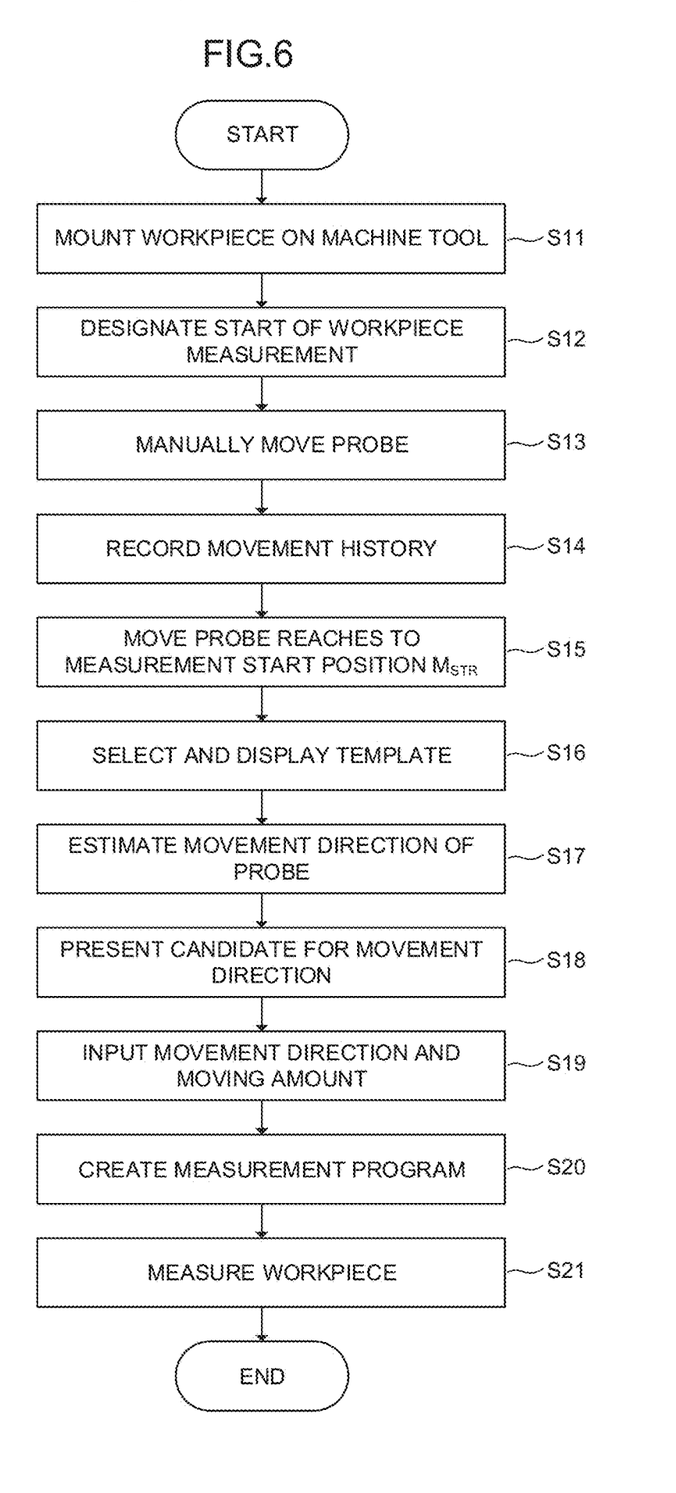
FIG. 6 is a diagram showing workpiece measurement procedure for the numerical controller according to the present disclosure.

A measurement method for the workpiece 51 will now be described with reference to the flowchart of FIG. 6.

First, the workpiece 51 to be measured is mounted on the machine tool 200 (Step S11). After the workpiece 51 is mounted on the machine tool 200, the start of the measurement of the workpiece 51 is designated. The designation of the measurement start may be replaced with switchover to a manual mode (Step S12).

Then, the user manually operates the probe 50 to move to a position close to the workpiece 51 with the manual operation unit 10 (Step S13). As this is done, the movement history recording unit 11 calculates the amount of movement of the manual operation unit 10 and records the movement history of the probe 50 into the storage unit 52 (Step S14).

The probe 50 reaches the measurement start position $M_{STR}$ by the manual operation (Step S15) and the user selects a template 17. The measurement program creation unit 12 displays a workpiece data input screen corresponding to the template 17 selected by the user (Step S16). The movement direction presentation unit 14 estimates a candidate for the movement direction of the probe 50 (Step S17). The movement direction presentation unit 14 presents the candidate direction for the automatic measurement on the workpiece data input screen (Step S18). In the example of FIG. 4, the movement start position $I_{STR}$ of the probe 50 and the current position $I_{crt}$ of the probe 50 are presented on the right-hand side of the workpiece data input screen, and the candidate for the movement direction estimated by the movement direction presentation unit 14 is presented by the "movement candidate: ↓(−Y direction)" at the upper right portion of the screen. On the other hand, the input area 21 for the movement direction of the probe 50 and the input area 22 for the distance between the workpiece 51 and the probe 50 exist on the left-hand side of the measurement data input screen. The popup screen 23 is displayed in the movement-direction input area 21 for the movement direction of the probe 50 in a superposed manner, and the candidate for the movement direction of the probe 50, "presentation content: to be moved in −Y-axis direction?", is presented on the popup screen 23.

The user inputs the movement direction and the moving amount of the probe 50 while confirming the display of the workpiece data input screen, actual arrangement of the machine tool 200, and the like (Step S19). The measurement program creation unit 12 creates the measurement program based on data input to the workpiece data input screen, the workpiece dimensions, the movement direction of the probe 50, and the like (Step S20). The workpiece measurement unit 16 measures the workpiece 51 according to the measurement program created by the measurement program creation unit 12 (Step S21).

While the numerical controller 100 for measuring the workpiece 51 and the measurement method for the workpiece 51 have so far been described, the present disclosure is not limited to the above-described example and can be suitably modified and embodied in various forms.

While the workpiece coordinate system is set with the end surface in the Y-axis direction regarded as the datum plane in the disclosure described above, for example, the shape of the workpiece 51 is not limited to this and can also be applied to workpieces 51 with other shapes, such as the shapes of a sphere, cylinder, hole, slope, and the like. The measurement part of the workpiece 51 is not limited to end surface and can also be applied to inner surface of a cylinder, hole, and the like. The method of presentation of the movement direction of the probe 50 is not limited to the above-described one. Furthermore, while a machining center with three or more control axes is given as an example of the machine tool of the present disclosure, the number of control axes and the machine type are not limited, for example, a two-axis-controlled lathe can also be applied.

In the disclosure described above, the measurement process is executed in the order of the manual probe operation, the selection of template 17, the input of workpiece data, and the start of automatic measurement. However, the order of processing is not limited to this, and the template 17 may be selected before the manual operation of the probe 50 or the workpiece dimensions may be input at the same time with the selection of the template 17. The main subject of the present disclosure is to estimate the positional relationship between the workpiece 51 and the probe 50, based on the history of the movement of the workpiece 51 during the manual operation, and present it to the user. Steps that are unrelated to the main subject may be suitably changed.

The invention claimed is:

1. A control device for an industrial machine configured to control a probe to measure the position of a workpiece, the control device comprising:
   a manual operation unit configured to accept a manual operation of the probe from a user;
   a movement history recording unit configured to record the history of movement of the probe by the manual operation;
   a measurement program creation unit configured to create a measurement program for the workpiece;
   a movement direction presentation unit configured to estimate a candidate for the movement direction of the probe based on the history of movement of the probe by the manual operation and present the user with the candidate of the movement direction of the probe to be used in the creation of the measurement program for the workpiece; and
   an input unit configured to accept the user's input including the movement direction,
   the measurement program creation unit being configured to create the measurement program for the workpiece using the user's input including the moving direction.

2. The control device according to claim 1, wherein the movement history recording unit records the movement history of the manual operation as the probe is moved to a measurement start position for the workpiece.

3. The control device according to claim 1, wherein the industrial machine has a plurality of axes, the movement history recording unit records a movement history for each of the axes, and the movement direction presentation unit presents a candidate for the movement direction for each axis to the user.

4. The control device according to claim 1, wherein the movement direction presentation unit presents the candidate for the movement direction of the probe to the user based on the last or final-stage movement direction in the movement history.

5. The control device according to claim 1, wherein the movement direction presentation unit presents the candidate for the movement direction of the probe to the user based on the amount of movement of the probe in the movement history.

6. The control device according to claim 1, wherein the movement history recording unit records the amount of movement of the probe, and the movement direction presentation unit uses only movement histories with large enough amounts of movement for estimation of the movement direction.

7. A measurement system configured to control a probe to measure a workpiece, the measurement system comprising:
   a manual operation unit configured to accept a manual operation of the probe from a user;
   a movement history recording unit configured to record the history of movement of the probe by the manual operation;
   a measurement program creation unit configured to create a measurement program for the workpiece;
   a movement direction presentation unit configured to estimate a candidate for the movement direction of the probe based on the history of movement of the probe by the manual operation and present the user with the candidate of the movement direction of the probe to be used in the creation of the measurement program for the workpiece; and an input unit configured to accept the user's input including the movement direction, the measurement program creation unit being configured to create the measurement program for the workpiece using the user's input including the movement direction.

8. A measurement method for controlling a probe to measure a workpiece, the measurement method comprising:
accepting a manual operation of the probe from a user;
recording the history of movement of the probe by the manual operation;
estimating a candidate for the movement direction of the probe based on the movement history of the probe;
presenting the user with the candidate of the movement direction of the probe to be used in the creation of the measurement program for the workpiece;
accepting the user's input including the movement direction; and
creating the measurement program for the workpiece using the user's input including the movement direction.

\* \* \* \* \*